United States Patent [19]
Howard

[11] Patent Number: 5,990,809
[45] Date of Patent: Nov. 23, 1999

[54] UNDERWATER SURVEYING SYSTEM

[76] Inventor: David M. Howard, 543 Bear Creek Dr., Hampstead, N.C. 28443

[21] Appl. No.: 09/052,255

[22] Filed: Mar. 31, 1998

[51] Int. Cl.[6] .................................................. G08G 1/123
[52] U.S. Cl. .......................... 340/988; 340/989; 340/990; 340/995; 324/323; 342/357.06; 342/357.16; 342/357.09; 701/2; 701/207; 701/213; 701/215; 33/121; 33/122; 33/123; 33/124
[58] Field of Search ...................................... 340/989, 988, 340/990, 995; 324/323; 342/357.06, 357.09, 357.17; 701/2, 215, 207, 213; 33/121, 122, 123, 124

[56] References Cited

U.S. PATENT DOCUMENTS

| | | | |
|---|---|---|---|
| 3,500,648 | 3/1970 | Daniell | 405/192 |
| 3,604,119 | 9/1971 | Inoue | 33/773 |
| 3,635,183 | 1/1972 | Keatinge | 114/330 |
| 3,716,923 | 2/1973 | Bazhaw | 33/264 |
| 3,812,922 | 5/1974 | Stechler | 175/6 |
| 4,026,376 | 5/1977 | Gee | 180/68.1 |
| 4,137,638 | 2/1979 | Watts | 33/701 |
| 4,568,294 | 2/1986 | Owsen | 440/95 |
| 4,611,313 | 9/1986 | Ziese | 367/88 |
| 4,814,711 | 3/1989 | Olsen et al. | 324/331 |
| 5,025,150 | 6/1991 | Oldham et al. | 150/253 |
| 5,203,099 | 4/1993 | Naranjo et al. | 37/329 |
| 5,291,458 | 3/1994 | Harre | 367/88 |
| 5,477,459 | 12/1995 | Clegg et al. | 701/300 |
| 5,614,913 | 3/1997 | Nichols et al. | 342/357.12 |
| 5,629,626 | 5/1997 | Russell et al. | 324/345 |
| 5,671,160 | 9/1997 | Julian | 702/94 |
| 5,689,475 | 11/1997 | Chaumet-Lagrange | 367/88 |
| 5,774,826 | 6/1998 | McBride | 701/207 |

*Primary Examiner*—Benjamin C. Lee

[57] ABSTRACT

The hydrography of a land area beneath a shallow body of water is determined by driving a submersible, remotely controlled, powered vehicle along a route over the land area. The vehicle includes a chassis, a drive mechanism, a drive control module to control the drive mechanism, and a mast extending upwardly from the chassis, with the top end of the mast projecting above the body of water. A position indicator, such as a global positioning system, mounted adjacent the mast top end, determines the position of the position indicator, and transmits position data to a receiving unit at a remote location. A transmitter at the remote location transmits instructions to the drive control module to control the vehicle.

20 Claims, 5 Drawing Sheets

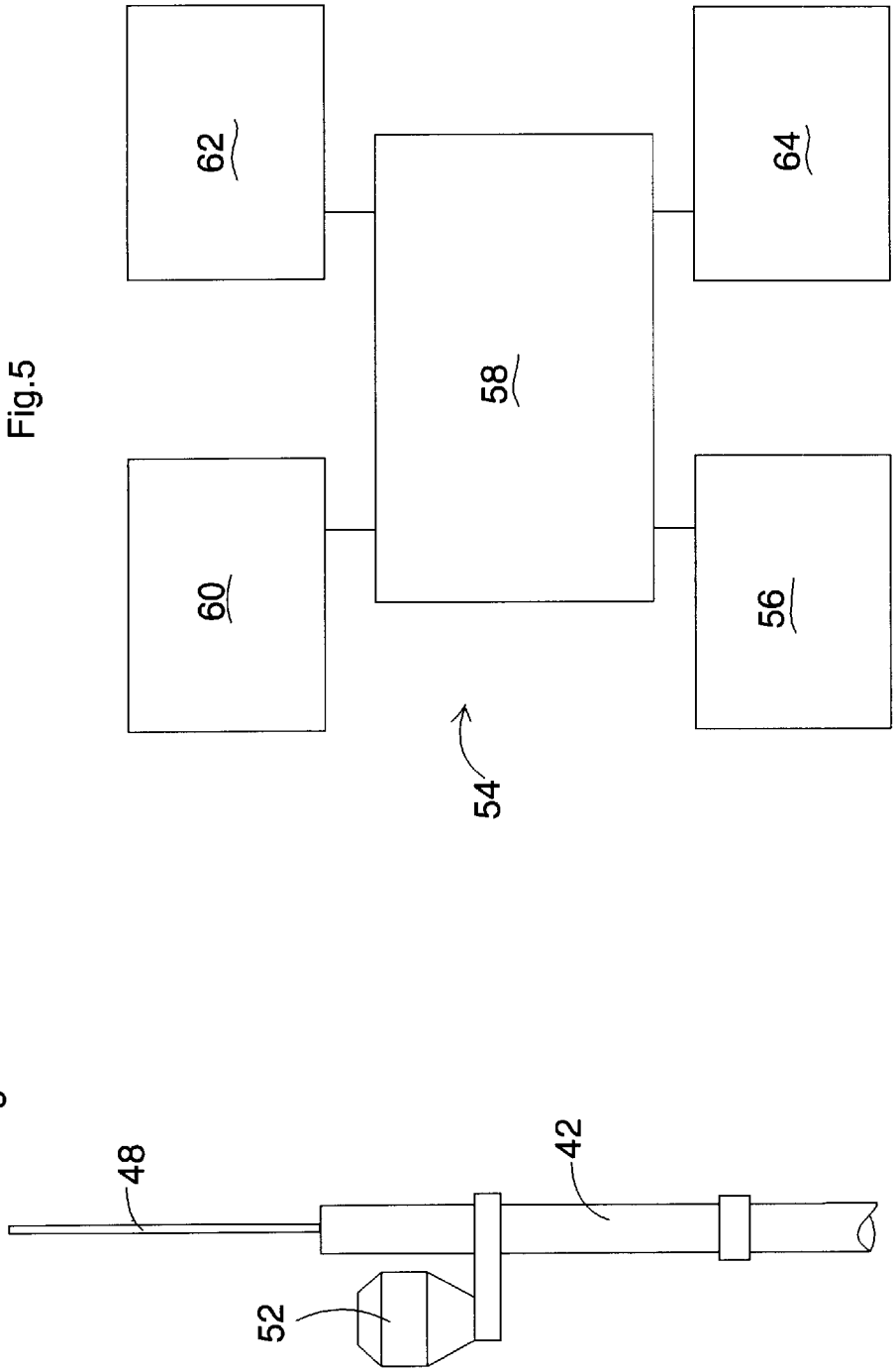

UNDERWATER SURVEYING SYSTEM

BACKGROUND OF THE INVENTION (1) Field of the Invention

The present invention relates generally to a remotely controlled vehicle designed for underwater operation, and in particular to a system for surveying the hydrography of a land area beneath a body of water, such as adjacent a shoreline.

(2) Description of the Prior Art

Determination of the hydrography, i.e., the underwater topography, of land beneath shallow bodies of water is often required for activities such as beach renourishment, in which the land altitude within up to about 1,500 feet of a beach must be determined both before and after renourishment activities. Similar measurements are required in other shallow water dredging activities.

Due to the turbulence of the water in these areas, simple measurement from a boat with a sounding device is not possible. When conventional surveying equipment is used, a surveyor's rod is carried out into the water by one individual, while another individual views the rod with a surveyor's level from the beach. This method is less than satisfactory, particularly where the water is more than four or five feet deep.

Other attempts have been made to address this need by towing a four-wheeled cart with an upwardly extending mast containing height markings across the area to be surveyed. The cart has been either carried out to the side of the area opposite the beach and pulled in to the beach with a cable or line, or the cart has been towed behind a boat or jet ski. This approach has also been less than satisfactory, since it is time consuming difficult for the surveyor to focus on the mast, and due to the fact that the turbulent water forces against the cable or line alters the path or the cart, and may cause the cart to capsize.

Thus, there is a continuing need for a method and apparatus for accurately measuring the hydrography of a land area beneath a shallow body of water, such as the water adjacent a beach.

SUMMARY OF THE INVENTION

The present invention relates to a system to survey the hydrography of a land surface beneath a body of water, such as the land area within about 1,500 feet of a beach. In general, the system is comprised of a powered mobile unit or vehicle adapted to carry an upwardly projecting mast that extends above the water level when the vehicle is moved along the land surface, and a control unit adapted to be operated from the land adjacent the body of water.

The vehicle forming a part of the present system is comprised of a wheeled chassis, supporting an internal combustion engine that drives at least two of the wheels, and preferably all four wheels, of the vehicle through a drive mechanism. A waterproof housing encloses the engine, and each wheel is sealed to prevent entry of water into the drive mechanism.

A mast extends upwardly from the chassis and included intake and exhaust conduits that communicate with the engine. The intake and exhaust conduits extend to a height sufficient to ensure that their upper ends remain above water during operation of the vehicle. The upper end of the mast also includes a means for determining the level of the land, and a means for communicating with the remote operating unit. The mast may be designed to fold for storage during transportation of the vehicle.

The land-based control unit is comprised of a controller for controlling the operation of the vehicle, and a receiver for receiving survey data. For example, the controller may be a transmitter that transmits control signals to a receiver on the vehicle mast, with the receiver in turn being in communication with the engine and drive mechanism. The type of data receiver used will depend upon the method used to generate survey data, and can be as simple as a surveyor's level or a receiver for receiving electronic transmissions.

When used, the operator, using the remotely located transmitter, drives the vehicle along an underwater route or pathway across the land area to be surveyed. The vehicle may be controlled manually for the purpose, or the control unit may include a processor programmed to operate in the transmitter in accordance with a software program. As the vehicle moves along the pathway, the vehicle will move upwardly or downwardly as the height of the land surface changes, moving the exposed upper end of the mast up or down. Vertical movement of the mast is monitored by the receiver unit on land, and the movement information is recorded to chart the hydrography of the land area being studied.

The vehicle chassis is comprised of a frame and attached wheels. The exact construction of the chassis is not significant to the invention, so long as the chassis includes mounting locations for the engine, the mast and the wheels. Preferably, the wheels are mounted on axles that extend into axle receiving cylinders forming a part of the chassis. Desirably, the axles and cylinders are designed so that the axles are telescoping within the cylinders, permitting the wheels to be extended outwardly during use of the vehicle to provide greater stability, while being retractable during storage and transportation of the vehicle. The chassis also preferably includes internal conduits within its framework for use in circulating coolant to cool the engine during operation of the vehicle.

The internal combustion engine which is preferably a diesel engine, is operatively connected via a drive mechanism to at least one wheel, and preferably two wheels, on either side of the vehicle to provide driving power. Preferably, the engine is operatively connected to all of the vehicle wheels for greater mobility and control.

In the preferred embodiment of the invention, the drive mechanism is a pump driven by the engine, with the pump being connected via fluid lines to hydraulic motors attached to each of the powered wheels. With a drive mechanism of this type, hydraulic fluid is pumped by the pump through the fluid lines or conduits to the hydraulic motors to rotate the motors in a known manner. The direction of each hydraulic motor rotation, and thus the direction of rotation of the attached wheel, is determined by one or more valves positioned in the hydraulic line. These valves, housed within a waterproof housing, are independently controlled from the land-based control unit to determine the direction of vehicle movement, and to permit skid steering of the vehicle. The pump is also protected by a waterproof housing, and each wheel is constructed to seal the hydraulic motors from exposure to water.

The vehicle mast is mounted at its base to the vehicle frame and extends vertically upward to an upper end that is above the water level during use of the vehicle. The mast includes an intake conduit having a lower end connected to the air intake of the engine, and an exhaust conduit having a lower end connected to the exhaust outlet of the engine. The intake and exhaust conduits have upper ends adjacent the upper end of the mast. For most uses, the upper end of the mast will be from about 20 to about 30 feet, preferably about 25 feet above the land surface. Depending upon the construction material used, the mast may be formed entirely of the conduits, which are preferably joined to each other, or an additional support frame or shaft may be included.

The height indicator is located adjacent the top of the mast to be visible from the land-based operating unit. The type of indicator used depends upon the sophistication of the system design. In its most basic form, the height indicator may be comprised simply of one or more marks or indicators on the mast denoting the height of each line above the land surface. In this embodiment, the land-based data-receiving unit may be simply a surveyor's level, through which the operator or surveyor views the mast in a known manner to determine the height of the mast marker, and thus the land altitude.

For more exacting measurements, which can be automatically transmitted to a land-based recorder, the position indicator may be a global positioning system (GPS) attached adjacent the top of the mast. With this more sophisticated mechanism, the GPS operates in a known manner to determine the distance to a plurality of satellites, and thereby determine the position of the GPS. By subtraction of the known distance from the GPS unit to the bottom of the vehicle, the altitude of the land beneath the vehicle can be determined, as well as the longitude and latitude. A transmitter can then be used to send this information to the remote operating unit. Other known survey devices, such as a prism in conjunction with a total station on shore, can also be used as the position indicator.

A drive control is also located on the vehicle, and includes a receiver to receive transmitted instructions from a remote drive control transmitter. The drive control module communicates through appropriate wiring with engine controls, such as the accelerator, and with valve controls used to control the flow of hydraulic fluid in the hydraulic lines.

Thus, one embodiment of the vehicle may be comprised of a chassis constructed of welded metal, e.g., marine grade aluminum or steel, tubing with mounting plates for a diesel engine, a hydraulic fluid pump and a mast. The chassis also includes front and rear, transverse horizontal axle mounting cylinders with outer axle-receiving openings. A section of the tubing forming the chassis is designed to communicate with engine coolant lines, so that coolant can circulate through the chassis section to cool the engine.

An axle telescopes within each of the axle cylinders between retracted and extended positions, with pins or other fasteners being used to maintain the axles in the desired position. The outer end of each axle supports a hydraulic motor with an outwardly extending, rotatable shaft. A wheel comprised of a rim and a resilient tire is mounted on each of the hydraulic motor shafts. A waterproof seal is positioned between the motor shaft and the motor.

A diesel engine is mounted on the chassis, and is attached via its drive shaft to a hydraulic pump also mounted on the chassis. Hydraulic lines connect each of the hydraulic motors to the hydraulic pump. Valves are interposed in each line to control flow of hydraulic fluid carried in the lines to the motors to control the fluid flow path, and thus the direction of motor and wheel rotation. A waterproof housing encloses the engine and pump.

A mast is mounted at its lower end to the chassis mount, which preferably is located at the top of the chassis above the engine housing. The lower ends of the intake and exhaust conduits forming a part of the mast communicate through the engine housing with the intake and exhaust manifolds, respectively, of the engine to allow intake of air and exhaust of combustion gases. The mast is hinged with a waterproof connection at its lower end adjacent the chassis, and preferably also at a point about one-third to one-half of the distance up the mast, so that the mast can be folded for transportation of the vehicle.

The engine accelerator and the hydraulic valves are attached to solenoids or other electrically operated components that are connected to a processor that communicates with the land-based control unit. The processor may be located adjacent the top of the mast or at some waterproof location in the vehicle, and joined by wiring to the control components. An antenna located adjacent the top of the mast and connected to the processor, receives transmissions from the land-based unit.

In one embodiment, a Global Positioning System receiver (GPS) is positioned adjacent the top of the mast. The GPS receiver operates in a known manner using transmissions from satellites, and will not be described in detail. Both the longitudinal and latitudinal position of the GPS receiver, as well as the altitude above sea level can be calculated to within one meter or less using this known technology. Mapping software is also available to convert a plurality of measurements into a hydrographic or topographical map of the measured land area. Suitable GPS receivers and mapping software are available, for example, from Trimble Navigation Ltd., Sunnyvale, Calif.

Thus, if the height of the GPS receiver is known, and the distance from the GPS receiver to the bottom of the vehicle is known, the altitude of the land beneath the vehicle can be determined by adding the distance between the bottom of the vehicle to the determined GPS receiver's altitude.

Information generated by the GPS receiver relating to the height and the longitudinal and latitudinal of the GPS receiver is transmitted via transmitter to a land-based receiver. The land-based receiver communicates with a processor to process the data in accordance with a software program that converts the data received over a period of time into a hydrographic map of the land area being surveyed. This program can also be connected to the remote transmitter to control the pathway traveled by the vehicle.

The land-based operating unit may simply be a transmitter, such as a hand-held transmitter with one or more joy sticks and variable switches that is used by the operator to transmit control signals to the vehicle receiver, with the routing being based upon the operator's visual observation of the vehicle mast position. Alternatively, the control unit can include a processor that is programmed with information, such as a map, pertaining to the land area to be surveyed, and a routing for the vehicle. This processor can be in communication with, and programmed to operate, a transmitter to transmit programmed routing information to the vehicle receiver.

Mast position can be determined by visual inspection using conventional survey equipment, such as a surveyor's level or theodolite. Data pertaining to each measurement can be manually recorded to show the position of the mast height indicator at a given location, and thus the topography of the land area resulting from a plurality of these measurements. It should be apparent from this embodiment that the control unit can be comprised of a vehicle control unit and a data receiver that are not physically connected.

Alternatively, the position can be determined by using a receiver tuned to receive transmitted information from the GPS on the vehicle mast, and recording this information in a processor, such as the processor used to transmit control information to the vehicle. Thus, when a program as described above is used to control the vehicle movement along a predetermined route, information received from the GPS can be recorded to show the resultant land level along the same route.

Thus, in operation, the operator using the remote transmitter, drives the vehicle along an underwater route with the top of the vehicle mast and the position indicator projecting above the water. The operator then measures the location of the vehicle area and the height of the position indicator at a plurality of locations along the vehicle route. The relative height of the land is then determined by subtracting the distance from the base of the vehicle to the position indicator. The data is then recorded for a plurality of measurement locations to ascertain the topography of the land area being measured.

BRIEF DESCRIPTION OF THE DRAWINGS

FIG. 4 is a side view of the top of the mast illustrating mounting of the GPS receiver and antenna.

FIG. 5 is a schematic of the remote operating unit.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
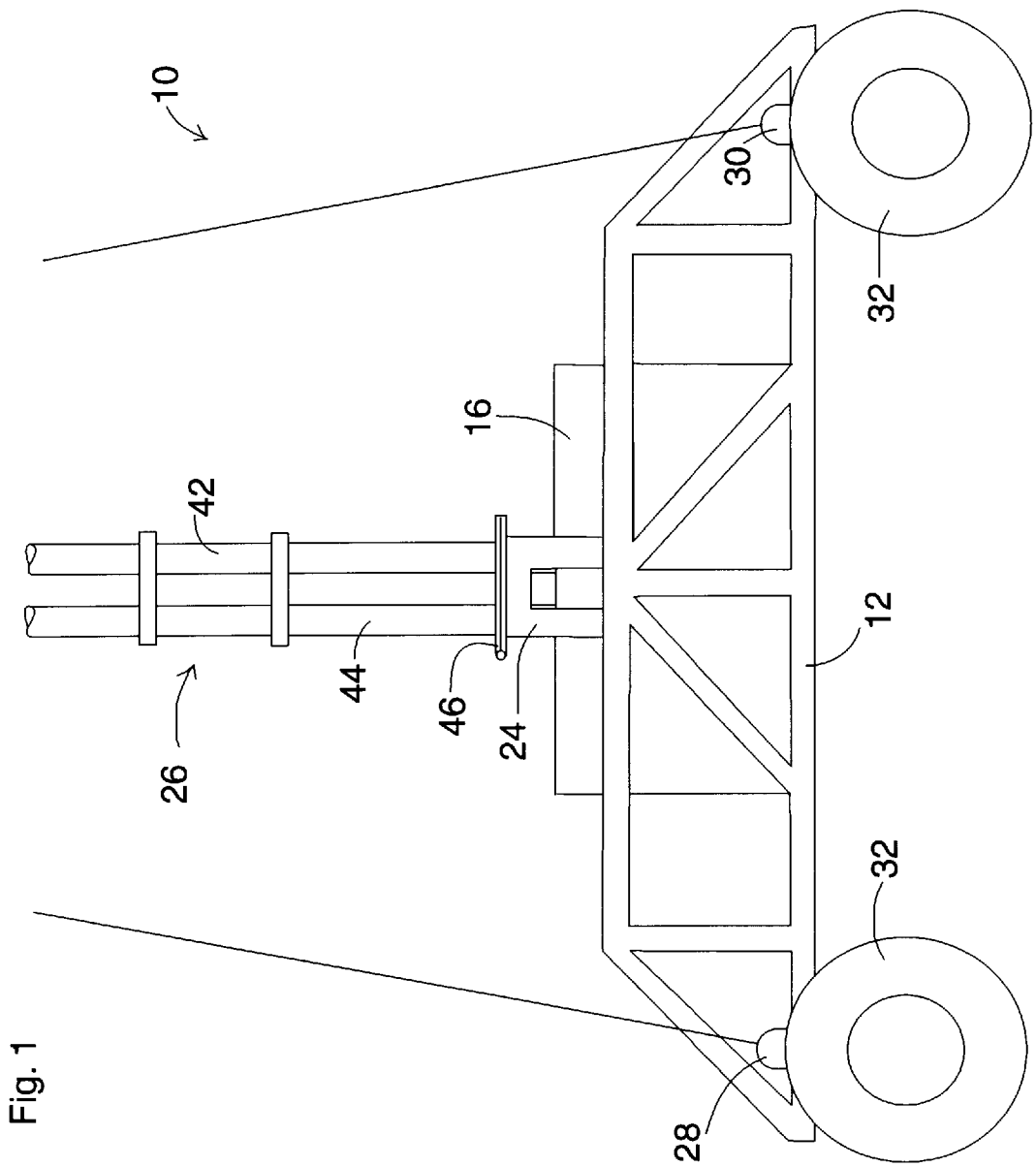
FIG. 1 is a side view of the vehicle with the upper part of the mast removed for illustration purposes.
Figure 2:
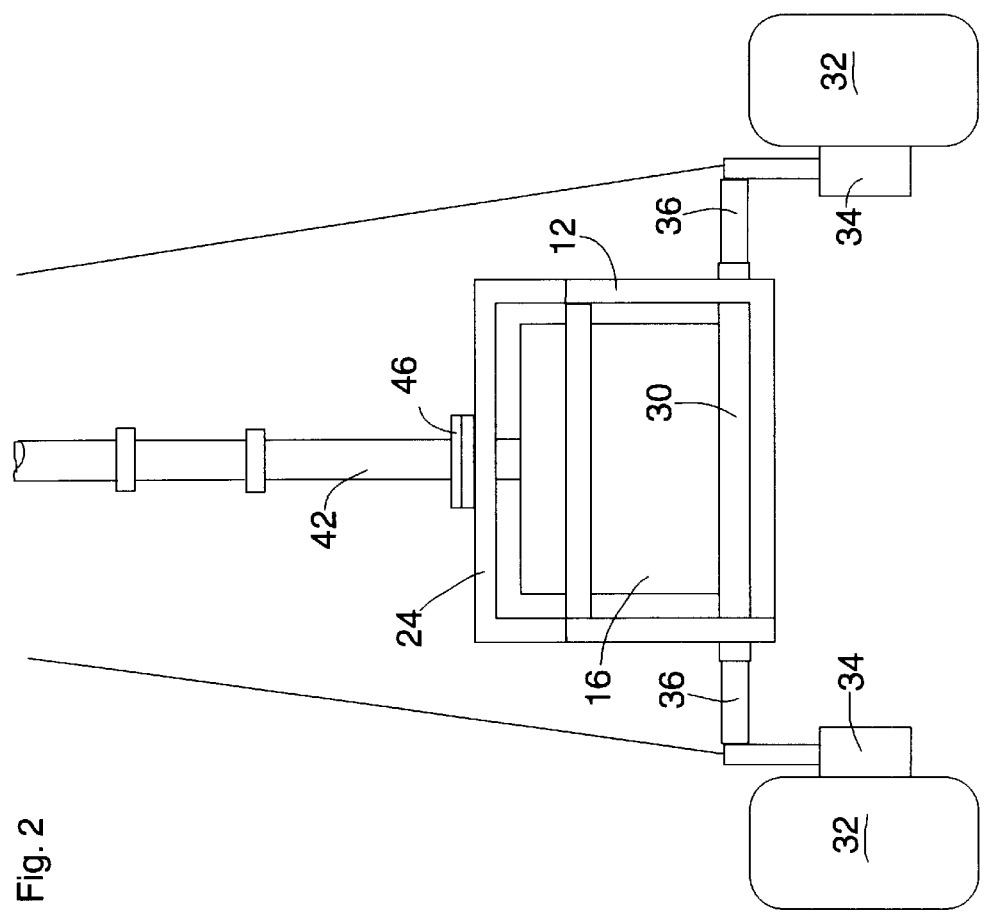
FIG. 2 is a front view of the vehicle with the upper part of the mast removed for illustration purposes.
Figure 3:
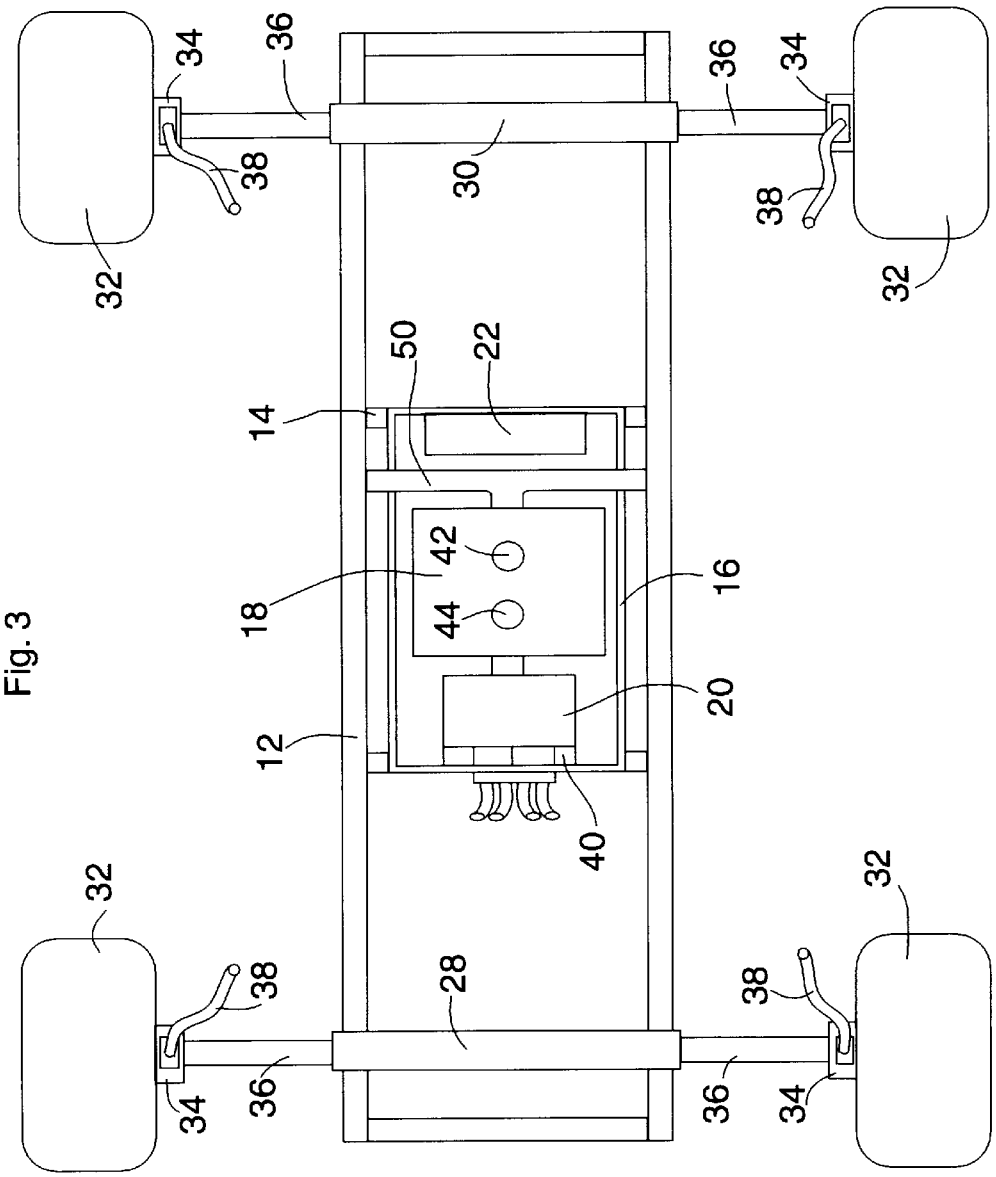
FIG. 3 is a top view of the vehicle with the mast and upper part of the waterproof housing removed to show the interior of the waterproof compartment.
Figure 6:
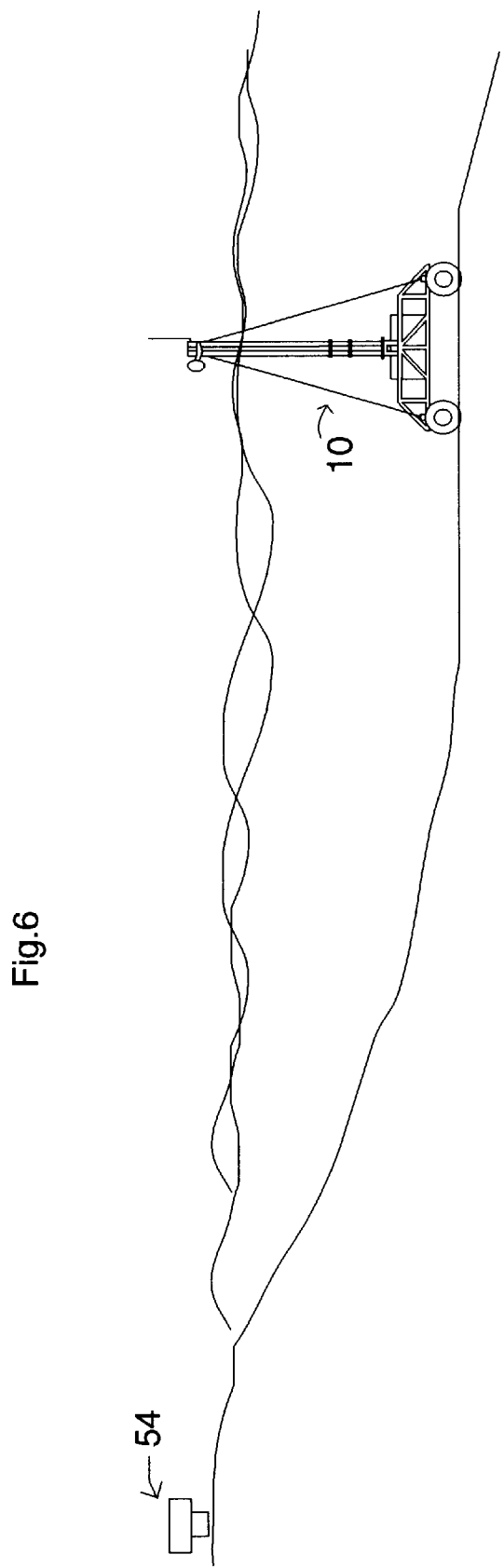
FIG. 6 is an illustration of the survey vehicle in a submerged position, with the remote operating unit on the beach.

A preferred embodiment of the survey vehicle, generally 10, as best illustrated in FIGS. 1–4, is comprised of a chassis 12 constructed of welded aluminum tubing, and includes mount 14 for a waterproof housing 16, housing a diesel engine 18, a hydraulic fluid pump 20, and a drive control module 22. A second mount 24 supports a vertical mast 26. Axle mounting cylinders 28 and 30 are positioned at the front and rear of chassis 12, respectively.

Wheels 32 are mounted on the shafts of hydraulic motors 34, with wheels 32 and motors 34 being mounted on the ends of axles 36 that telescope in cylinders 28 and 30 between retracted and extended positions. Motors 34 are powered by hydraulic fluid pumped through hydraulic lines 38 by hydraulic pump 20, which in turn is powered by diesel engine 18. Valves 40 in lines 38 determine the hydraulic fluid flow path, and thus the direction of motor and wheel rotation.

Mast 26, mounted at its lower end to mast mount 24, includes vertical air intake conduit 42 and combustion exhaust conduit 44. Mast 26 is hinged at waterproof hinge 46 so that mast 26 can be folded during transportation.

Hydraulic valves 40 and the controls of engine 18 are controlled through drive control module 22 which receives remote control instructions via antenna 48 at the top of mast 26.

Cooling of engine 18 is through conduit 50 that circulates coolant through engine 18 and through a part of tubular chassis 12.

A Global Positioning System (GPS) 52 including a receiver and transmitter is positioned adjacent the top of mast 26 to calculate the longitudinal and latitudinal position, and the altitude above sea level of GPS 52. Data generated by GPS 52 is then transmitted to land-based operating unit, generally 54 for processing.

Operating unit 54, schematically illustrated in FIG. 5, is comprised of a receiver 56 to receive data from GPS 52, a processor 58 is attached to receiver 56 to process received data, using known software programs, to convert the data into a hydrographic map information about the area being surveyed, and a transmitter 60 to control engine 18 and valves 40 through drive control module 22 to drive vehicle 10 along a programmed route. It will be understood that transmitter 60 can be operated independently of processor 58. Operating unit 54 may also include a recorder 62 for recording hydrographic information received from processor 58, and a monitor 64 for displaying processed information to the operator.

In operation, vehicle 10 is driven along an underwater route, with GPS 52 being held above water level by mast 26. Transmitter 60 transmits control signals to drive control module 22, which controls engine 18 and valves 40 to move vehicle 10 along the desired route. GPS 52 sends position information to receiver 56 at a plurality of measurement points along the route. The information is processed by processor 58 to produce hydrographic information about the land area covered by the route, including latitude and longitude, and altitude of the land at each measurement point.

Certain modifications and improvements will occur to those skilled in the art upon a reading of the foregoing description. Such modifications and improvements have been deleted herein for the sake of conciseness and readability but are properly within the scope of the follow claims.

What is claimed is:

1. A system for surveying the land area beneath a shallow body of water comprising:
   a) a submersible, remote controlled, powered vehicle for carrying an altitude indicator across a land area positioned beneath a shallow body of water, said vehicle including
      i) a generally rectangular chassis of welded metal tubing with four axle receiving openings;,
      ii) axles having inner ends extending into each of said axle receiving openings and outer ends, said axles telescoping in said openings between extended and retracted positions;
      iii) hydraulic motors mounted at the outer ends of said axles, said motors including rotatable shafts and valves;
      iv) wheels mounted on each of said motor shafts;
      v) a hydraulic fluid pump mounted on said chassis;
      vi) a diesel engine mounted on said chassis, said engine having a rotatable shaft connected to said pump;
      vii) hydraulic fluid lines connecting said pump to said hydraulic motors;
      viii) a drive control module connected to said engine and said hydraulic motor valve to control said engine and the direction of rotation of said hydraulic motor shafts;
      ix) a waterproof housing enclosing said engine and pump;

x) a mast extending upwardly from said chassis to a top end, said mast including an air intake conduit and a combustion exhaust conduit, said conduits having lower ends in communication with said engine and upper ends adapted to project above said body of water;

xi) an antenna adjacent the top of said mast; and xii) a position indicator adjacent the top of said mast, said position indicator including a global positioning system receiver for calculating position data, and a transmitter for transmitting position data to a remote receiver; and b) an operating unit to be located remotely from said vehicle, said operating unit including i) a data receiver for receiving data transmitted from said position indicator;

ii) a processor for receiving data from said data receiver and converting said data into a map of said land area; and iii) a transmitter for transmitting control instructions to said drive control module.

2. The system of claim 1, wherein said operating unit further includes a recorder for recording data processed by said processor and a monitor for displaying data processed by said processor.

3. A system for surveying the land area beneath a shallow body of water comprising:

a) a powered vehicle adapted to move across said land area, said vehicle including a chassis, a drive mechanism, a drive control module controlling said drive means, a mast extending upwardly from said chassis to a top end, and a position indicator adjacent said mast top end; and b) a remote operating unit including a data receiver for receiving data from said position indicator and a transmitter for transmitting control instructions to said drive control module.

4. The system of claim 3, wherein said drive mechanism includes a plurality of motors with rotatable shafts, each shaft being operatively connected to a wheel, and said drive control module is operatively connected to said shafts to control the direction of rotation of said shafts.

5. The system of claim 4, wherein said chassis includes axle receiving openings, and axles adapted to telescope within said openings, said axles having outer ends upon which said wheels and motors are mounted.

6. The system of claim 3, wherein said position indicator is a global positioning system.

7. The system of claim 3, wherein said drive mechanism includes a hydraulic pump powered by an internal combustion engine.

8. The system of claim 7, further including a waterproof housing enclosing said pump and engine.

9. The system of claim 7, wherein said mast includes an air intake conduit and a combustion exhaust conduit, said conduits having lower ends in communication with said engine and upper ends adapted to project above said body of water.

10. The system of claim 7, further including a coolant conduit to circulate coolant through said engine, a part of said chassis forming a part of said coolant conduit.

11. The system of claim 3, wherein said operating unit further includes a processor connected to said receiver for converting information received from said receiver into a hydrographic map of said land area.

12. The system of claim 3, wherein said mast is hinged.

13. A submersible, remote controlled, powered vehicle for carrying an altitude indicator across a land area positioned beneath a shallow body of water, said vehicle comprising:

a) a chassis;

b) a plurality of wheels supporting said chassis, each of said wheels being mounted on a shaft of a hydraulic motor;

c) a hydraulic fluid pump powered by an internal combustion engine mounted on said chassis;

d) hydraulic fluid lines connecting said pump to said hydraulic motors;

e) a drive control module controlling said engine and the direction of rotation of said hydraulic motor shafts;

f) a mast extending upwardly from said chassis to a top end; and g) a position indicator adjacent said mast top end to provide altitude data.

14. The vehicle of claim 13, wherein said chassis is formed of welded metal tubing, and includes a plurality of axle receiving openings, said wheels and motors being mounted on axles adapted to telescope in said openings.

15. The vehicle of claim 13, wherein said internal combustion engine is a diesel engine.

16. The vehicle of claim 13, further including an antenna adjacent the top of said mast, said drive control module receiving control signals through said antenna from a remote transmitter.

17. The vehicle of claim 13, wherein said position indicator includes a global positioning system for calculating position, and a transmitter for transmitting position data to a remote receiver.

18. A method for determining the hydrography of a land area beneath a body of water comprising:

a) providing a submersible, remote controlled, powered vehicle including a chassis, a drive mechanism, a drive control module controlling said drive means, a mast extending upwardly from said chassis to a top end, and a position indicator adjacent said mast top end;

b) providing an operating unit adapted to be located adjacent said land area, said operating unit including a data receiver for receiving data from said position indicator and a transmitter for transmitting control instructions to said drive control module;

c) transmitting instructions from said transmitter to said drive control module to drive said vehicle along a route within said land area with signals from said transmitter;

d) receiving data from said position indicator; and e) converting said data into a hydrographic map of said land area.

19. The method of claim 18, wherein said position indicator is a global positioning system adapted to receive distance information form a plurality of satellites, determine the altitude of said position indicator from said distance information, and transmit said altitude to a remote receiver.

20. The method of claim 18, wherein said vehicle is driven along a predetermined route.

* * * * *